United States Patent
Doppler et al.

(10) Patent No.: US 8,279,851 B2
(45) Date of Patent: Oct. 2, 2012

(54) APPARATUS, SYSTEM, AND METHOD FOR OBTAINING LOCAL CONNECTIVITY SETTINGS

(75) Inventors: Klaus Doppler, Espoo (FI); Cassio Ribeiro, Espoo (FI); Carl Simon Wijting, Helsinki (FI); Mika P. Rinne, Espoo (FI); Klaus Hugl, Helsinki (FI)

(73) Assignee: Nokia Corporation, Espoo (FI)

( * ) Notice: Subject to any disclaimer, the term of this patent is extended or adjusted under 35 U.S.C. 154(b) by 409 days.

(21) Appl. No.: 12/222,783

(22) Filed: Aug. 15, 2008

(65) Prior Publication Data

US 2010/0040029 A1 Feb. 18, 2010

(51) Int. Cl.
*H04L 12/66* (2006.01)

(52) U.S. Cl. ... 370/352; 370/356; 370/466; 379/201.02; 455/435.1; 725/109

(58) Field of Classification Search .................. 370/352, 370/356, 465, 466; 379/201.01, 201.02, 379/88.17; 455/435.1, 445; 725/109, 110
See application file for complete search history.

(56) References Cited

U.S. PATENT DOCUMENTS

| | | | |
|---|---|---|---|
| 7,367,888 B1 * | 5/2008 | Chen et al. ................ | 463/42 |
| 7,548,758 B2 * | 6/2009 | Periyalwar et al. .......... | 455/517 |
| 2005/0021626 A1 | 1/2005 | Prajapat et al. | |
| 2005/0128995 A1 | 6/2005 | Ott et al. | |
| 2006/0165060 A1 * | 7/2006 | Dua ............................ | 370/352 |
| 2006/0258289 A1 * | 11/2006 | Dua ............................ | 455/41.3 |
| 2007/0055743 A1 | 3/2007 | Pirtle et al. | |
| 2007/0104138 A1 | 5/2007 | Rudolf et al. | |
| 2007/0155307 A1 | 7/2007 | Ng et al. | |
| 2007/0195731 A1 | 8/2007 | Camp, Jr. | |
| 2007/0213039 A1 * | 9/2007 | Skog ......................... | 455/414.3 |
| 2007/0280109 A1 | 12/2007 | Jaatinen | |
| 2008/0002658 A1 | 1/2008 | Soliman | |
| 2008/0153411 A1 | 6/2008 | Claussen et al. | |
| 2008/0187122 A1 * | 8/2008 | Baker ....................... | 379/218.01 |
| 2009/0022116 A1 * | 1/2009 | Walley et al. ............... | 370/338 |
| 2009/0221325 A1 | 9/2009 | Periyalwar et al. | |
| 2009/0268655 A1 | 10/2009 | Bertz et al. | |

FOREIGN PATENT DOCUMENTS

EP   1 653 401 A1   5/2006

(Continued)

OTHER PUBLICATIONS

P. Faltstrom et al. "RFC 3761—The E.164 to Uniform Resource Identifiers (URI) Dynamic Delegation Discovery System Application (EUNM)", Apr. 2004, IEEE, pp. 1-16.*

(Continued)

*Primary Examiner* — Jung Park
(74) *Attorney, Agent, or Firm* — Squire Sanders (US) LLP

(57) ABSTRACT

An apparatus, system, and method for a communication network that includes a mobile device, a target device, and a connection settings server. The mobile device is configured to transmit a request for device-to-device connection settings data to the connection settings server, the connection settings server is configured to receive the request, determine appropriate device-to-device connection settings data, and transmit the appropriate device-to-device connection settings data to the mobile device, the mobile device is further configured to receive the appropriate device-to-device connection settings data and establish a device-to-device connection with the target device, wherein the establishing of the device-to-device connection is facilitated by the device-to-device connection settings data.

44 Claims, 9 Drawing Sheets

FOREIGN PATENT DOCUMENTS

WO 2008/043970 A1 4/2008

OTHER PUBLICATIONS

Rosenbert et al. "RFC 3261 SIP: Session Initiation Protocol", Jun. 2002.*

International Search Report for International Application No. PCT/IB2009/006543 filed Aug. 13, 2009.

Office Action dated Dec. 8, 2011 issued in U.S. Appl. No. 12/216,953.

Final Office Action, dated Apr. 25, 2012; Issued on corresponding U.S. Appl. No. 12/216,953.

* cited by examiner

APPARATUS, SYSTEM, AND METHOD FOR OBTAINING LOCAL CONNECTIVITY SETTINGS

BACKGROUND OF THE INVENTION

1. Field of the Invention

The present invention relates generally to wireless communication networks. More specifically, the present invention relates to apparatuses, systems, and methods for device-to-device connections.

2. Description of the Related Art

Wireless networks often include multiple user terminals in a radio cell served by a base station. In many wireless networks, when two user terminals communicate with one another, all such communications must flow through the base station regardless of the physical distance separating the user terminals. Though such networks enable communication between two user terminals, such networks do not make optimal use of local communications between nearby devices, by requiring all communications to be sent via the base station.

In light of this deficiency, certain technologies have been used to enable user terminals to communicate with one another without involving the base station. Such technologies include wireless local area network (WLAN) technologies, Bluetooth technologies, and Ultra-wideband (UWB) radio technologies. Though these technologies may enable user terminals to communicate at least to a certain degree, the currently available technologies have certain deficiencies.

For example, enabling a WLAN or UWB system often involves device configuration, access point maintenance, and user data entry. Another example is the pairing process of Bluetooth technology, where a user is required to enter data, such as the secret passkey, into each Bluetooth device. As such, currently available device-to-device communication technologies require an undesirable amount of data entry and device configuration from a user and/or network administrator standpoint.

SUMMARY OF THE INVENTION

The present invention has been developed in response to the present state of the art, and in particular, in response to the problems and needs in the art that have not yet been fully solved by currently available communication system technologies. Accordingly, the present invention has been developed to enable a device-to-device connection settings retrieval apparatus, system, and method.

In one embodiment of the present invention, a method includes transmitting a device-to-device connection settings request, receiving device-to-device connection settings data, and establishing a device-to-device connection with a target device, wherein the establishing of the device-to-device connection is facilitated by the device-to-device connection settings data.

In some embodiments, the method also includes receiving device-to-device connection availability data inputs from a user, where the device-to-device connection availability data is configured to enable the transmitting of the request. In certain embodiments, the method also includes translating the device-to-device connection availability data into a uniform resource locator. In some embodiments, the transmitting of the request comprises automatically transmitting the request.

In some embodiments, the establishing of the device-to-device connection comprises selecting a best-suited radio technology for the establishing of the device-to-device connection. The method may also include selecting between a plurality of potential target devices and the transmitting of the device-to-device connection settings request may include communicating mobile device location data.

In certain embodiments, the transmitting and the receiving comprise transmitting and receiving via a public wireless network. In some embodiments, the transmitting and the receiving comprise transmitting and receiving via a local access network and/or cellular network. In certain embodiments, the request includes at least one of a phone number, a session initiation protocol address, and a uniform resource locator.

In another embodiment of the present invention, an apparatus includes a transmission unit configured to transmit a request for device-to-device connection settings, a reception unit configured to receive device-to-device connection settings data, and a connection establishment unit configured to establish a device-to-device connection with a target device, where establishment of the device-to-device connection is facilitated by the device-to-device connection settings data.

In certain embodiments, the apparatus includes an input/output unit configured to receive device-to-device connection availability data inputs from a user, where the device-to-device connection availability data is configured to enable transmission of the request. In some embodiments, the apparatus also includes a translation unit configured to translate the device-to-device connection availability data into a uniform resource locator. In certain embodiments, the transmission unit is configured to automatically transmit the request.

In some embodiments of the apparatus, the connection establishment unit may be configured to select a best-suited radio technology for establishment of the device-to-device connection. The connection establishment unit may also be configured to select between a plurality of potential target devices. The apparatus may further include a mobile device location unit configured to communicate location data, wherein the location data is configured to enable the establishing of the device-to-device connection with a selected target device.

In some embodiments, the transmission unit and the reception unit are configured to transmit the request and receive the device-to-device connection settings data via a public wireless network. In certain embodiments, the transmission unit and the reception unit are configured to transmit the request and receive the device-to-device connection settings data via a local access network and/or cellular network. In some embodiments, the request comprises at least one of a phone number, a session initiation protocol address, and a uniform resource locator.

In another embodiment of the present invention, an apparatus includes a means for transmitting a request for device-to-device connection settings, a means for receiving device-to-device connection settings data, and a means for establishing a device-to-device connection with a target device, where the establishing of the device-to-device connection is facilitated by the device-to-device connection settings data.

In another embodiment of the present invention, a computer program is embodied on a computer-readable medium. The computer program may be configured to control a processor to perform operations that include transmitting a request for device-to-device connection settings, receiving device-to-device connection settings data, and establishing a device-to-device connection with a target device, where the establishing of the device-to-device connection is facilitated by the device-to-device connection settings data.

In another embodiment of the present invention, a method includes a device-to-device connection settings data request, determining appropriate device-to-device connection settings data based on the request, and transmitting the appropriate device-to-device connection settings, where the device-to-device connection settings data is configured to enable a mobile terminal to establish a device-to-device connection with a target device.

In certain embodiments, the receiving of the device-to-device connection settings data request may include receiving mobile device location data configured to indicate a location of the mobile device. In some embodiments, the determining of appropriate device-to-device connection settings data comprises generating a list of registered target devices based on the mobile device location data. In certain embodiments, the determining of appropriate device-to-device connection settings data comprises searching for target devices using a local scope filter corresponding to the mobile device location data.

In another embodiment of the present invention, an apparatus may include a reception unit configured to receive a request for device-to-device connection settings data, a determination unit configured to determine appropriate device-to-device connection settings data, and a transmission unit configured to transmit the appropriate device-to-device connection settings data, wherein the device-to-device connection settings data is configured to enable a mobile terminal to establish a device-to-device connection with a target device.

In certain embodiments, the reception unit is further configured to receive mobile device location data configured to indicate a location of the mobile device. In some embodiments, the apparatus may also include a target device search unit configured to generate a list of registered target devices based on the mobile device location data, where the transmission unit is configured to transmit target device list data to the mobile device. The apparatus may also include a target device search unit configured to search for target devices using a local scope filter corresponding to the mobile device location data.

In another embodiment of the present invention, an apparatus may include a means for receiving a request for device-to-device connection settings data, a means for determining appropriate device-to-device connection settings data based on the request, and a means for transmitting the appropriate device-to-device connection settings, where the device-to-device connection settings data is configured to enable a mobile terminal to establish a device-to-device connection with a target device.

In another embodiment of the present invention, a computer program is embodied on a computer-readable medium. The computer program may be configured to control a processor to perform operations that include receiving a request for device-to-device connection settings data, determining appropriate device-to-device connection settings data based on the request, and transmitting the appropriate device-to-device connection settings, where the device-to-device connection settings data is configured to enable a mobile terminal to establish a device-to-device connection with a target device.

In another embodiment of the present invention, a method includes receiving a first device-to-device connection settings request from a mobile device and translating at least a portion of the first device-to-device connection settings request into second request data. The method also includes transmitting a second device-to-device connection settings data request to a connection settings server, the second device-to-device connection settings request comprising the second request data generated by the translating; the uniform resource locator, receiving device-to-device connection settings data from the connection settings server, transmitting the device-to-device connection settings data to the mobile device.

In some embodiments, the first device-to-device connection settings request comprises at least one of a phone number or a session initiation protocol address. In some embodiments, the second request data comprises at least one of a uniform resource locator or a uniform resource identity. In certain embodiments, the method is performed by an application server.

In another embodiment of the present invention, an apparatus includes a reception unit configured to receive a first device-to-device connection settings request from a mobile device and a translation unit configured to translate at least a portion of the first device-to-device connection settings request into second request data. The apparatus may also includes a transmission unit configured to transmit a second device-to-device connection settings data request to a connection settings server, the second device-to-device connection settings request comprising the second request data generated by the translation unit. The reception unit may also be configured to receive device-to-device connection settings data from the connection settings, and the transmission unit may also be configured to transmit the device-to-device connection settings data to the mobile device.

In certain embodiments, the first device-to-device connection settings request comprises at least one of a phone number or a session initiation protocol address. In some embodiments, the second request data comprises at least one of a uniform resource locator or a uniform resource identity. In certain embodiments, the apparatus comprises an application server.

In another embodiment of the present invention, an apparatus includes a means for receiving a first device-to-device connection settings request from a mobile device, and a means for translating at least a portion of the first device-to-device connection settings request into second request data. The apparatus may also include a means for transmitting a second device-to-device connection settings data request to a connection settings server, the second device-to-device connection settings request comprising the second request data generated by the translating; the uniform resource locator. The apparatus may further include a means for receiving device-to-device connection settings data from the connection settings server, and a means for transmitting the device-to-device connection settings data to the mobile device.

In another embodiment of the present invention, a computer program is embodied on a computer-readable medium. The computer program may be configured to control a processor to perform operations that include receiving a first device-to-device connection settings request from a mobile device and translating at least a portion of the first device-to-device connection settings request into second request data. The operations may also include transmitting a second device-to-device connection settings data request to a connection settings server, the second device-to-device connection settings request comprising the second request data generated by the translating; the uniform resource locator. The operations may further include receiving device-to-device connection settings data from the connection settings server and transmitting the device-to-device connection settings data to the mobile device.

Another embodiment of the present invention may comprise a system that includes a mobile device, a target device, and a connection settings server. The mobile device may be configured to transmit a request for device-to-device connection settings data to the connection settings server. Additionally, the connection settings server may be configured to receive the request, determine appropriate device-to-device connection settings data, and transmit the appropriate device-to-device connection settings data to the mobile device. Furthermore, the mobile device may further be configured to receive the appropriate device-to-device connection settings data and establish a device-to-device connection with the target device, where the establishing of the device-to-device connection is facilitated by the device-to-device connection settings data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENT(S)

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in the attached figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In addition, while the terms, data, packet, and/or datagram have been used in the description of the present invention, the invention has import to many types of network data. For purposes of this invention, the term data includes packet, cell, frame, datagram, bridge protocol data unit packet, packet data and any equivalents thereof.

Figure 1:
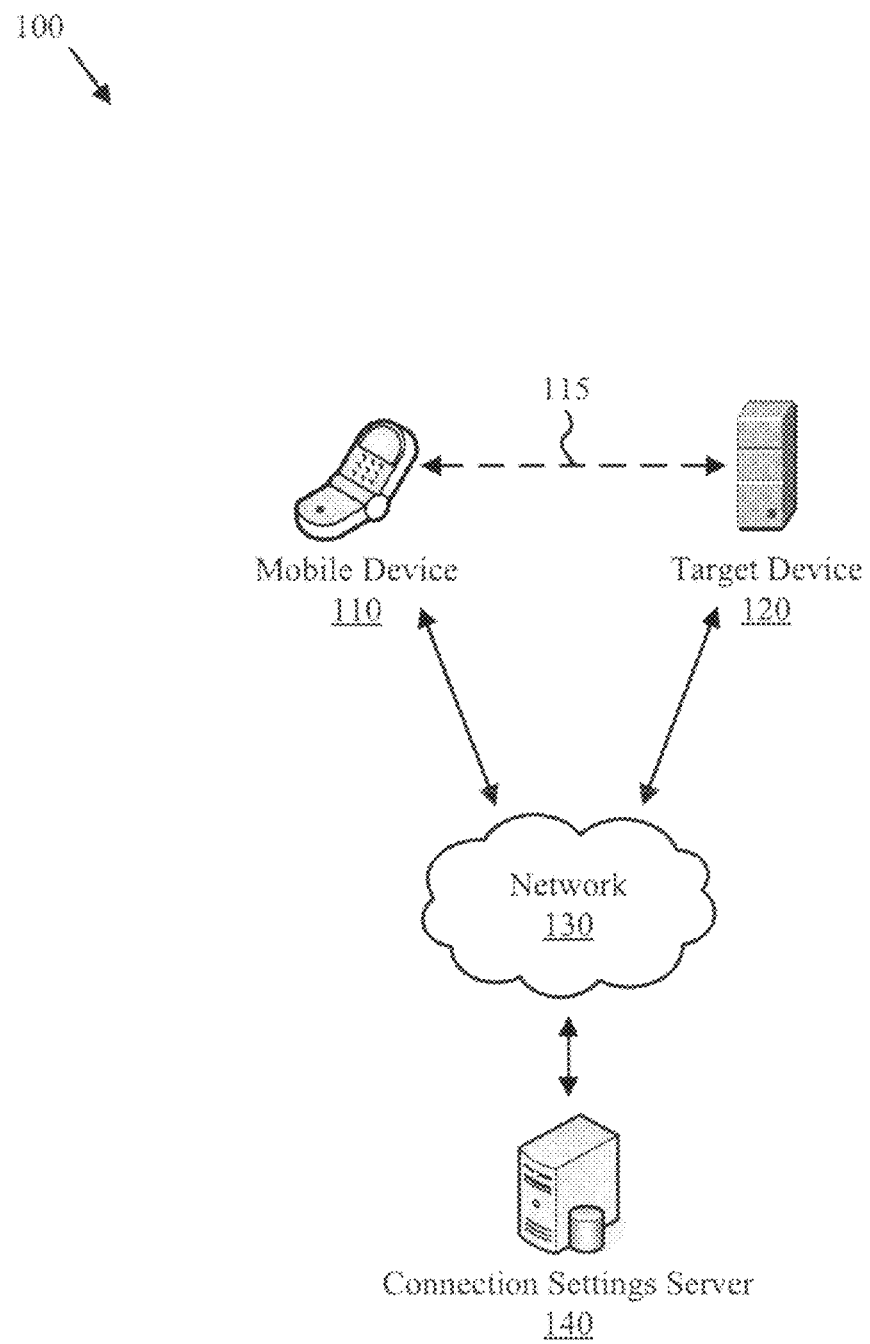
FIG. 1 is a block diagram of a simplified device-to-device connection system in accordance with one embodiment of the present invention.

FIG. 1 is a block diagram of a simplified device-to-device (D2D) connection system 100 in accordance with one embodiment of the present invention. The system 100 includes a mobile device 110, a target device 120, the network 130, and a connection settings server 140. The system 100 operates to retrieve device-to-device connection settings and thereby enable a device-to-device connection 115 between the mobile device 110 and the target device 120.

In certain embodiments, the mobile device 110 is configured to transmit a device-to-device connection settings data request to the connection settings server 140 via the network 130. Features of the network 130 are discussed in greater detail below and may include a cellular network and the Internet. The network may also include a local access point to which the mobile device 110 may connect.

The connection settings server 140 may be configured to determine appropriate device-to-device connection settings data and transmit the appropriate device-to-device connection settings data to the mobile device 110. As discussed in greater detail below, determining appropriate device-to-device connection settings data may depend on a variety of considerations such as the information contained in the request for the settings data, a location of the mobile device 110, and a location of one or more target devices 120. Additionally, the device-to-device connection settings data may be stored in various manners such as on a webpage, in a registry, and more.

The mobile device 110 may be configured to receive the device-to-device connection settings data. The device-to-device connection settings data may include a variety of data such as data indicating a type of radio technology (i.e., long term evolution (LTE) device-to-device radio, wireless local area network (WLAN) or Bluetooth). The device-to-device connection settings day may also include access point settings for a WLAN, an encryption method, an encryption key, Bluetooth pairing keys, and/or settings for multiple radio technologies. Upon receiving the settings data, the mobile device 110 may operate to establish a device-to-device connection 115 with the target device 120.

The device-to-device connection 115 established between the mobile device 110 and the target device 120 may include one or more technologies corresponding to the device-to-device connection settings data received from the connection settings server 140. In certain embodiments, the establishment of device-to-device connections creates an underlay network/underlay networks.

In some embodiments, an underlay network is a network that operates in the same frequency band as a cellular system. Additionally, an underlay network may operate on the same resources (time slot, frequency slot, spreading code, orthogonal frequency-division multiple access (OFDMA) resource block, a combination thereof, etc.) or use separate resources within the frequency band. Additionally, a device-to-device connection may include a connection, where at least some or all of the data is transmitted directly between two devices. In some embodiments the user plane data is transmitted directly and part or all of the control plane data is transmitted via a cellular network. Furthermore, the device-to-device connection may be established using multiple device-to-device connections that form a multi-hop connection.

In certain embodiments, the device-to-device connection is established and maintained using a device-to-device radio of the mobile device 110 and a device-to-device radio of the target device 120. A device-to-device connection may be an underlay network to networks including but not limited to $3^{rd}$ Generation Partnership Program (3GPP) High Speed Packet Access (HSPA) and Long Term Evolution (LTE) radio network and its evolutions as defined by 3GPP or a Worldwide Interoperability for Microwave Access (WiMAX) radio network as defined by IEEE 802.16 and its evolutions or a Universal Mobile Broadband (UMB) network and its evolutions.

It should be appreciated that the target device 120 may be any variety of devices capable of establishing a device-to-device connection with the mobile device 110 and providing services thereto. In certain embodiments, the target device 120 is a media server. As discussed in further detail below, a media server may include a variety of devices capable of establishing a device-to-device connection, such as a mobile device. In some embodiments, a media server may include a relatively stationary network device. In other embodiments, a media server may include a mobile device. Accordingly, the devices used to embody the mobile device 110 and the target device 120 may vary greatly.

Additionally, the services provided by the target device 120 may include many types of services such as downloading promotional material or uploading videos and pictures during a public event such as a music concert or sporting event. Such services may also include downloading tourist information including maps, schedules, promotional materials, pictures of tourists, and pictures of attractions. Furthermore, such services may include accessing shopping related information such as store locations, sales, and hours of operation. Accordingly, a type of service provided should not limit the scope of the present invention in any way.

Figure 2:
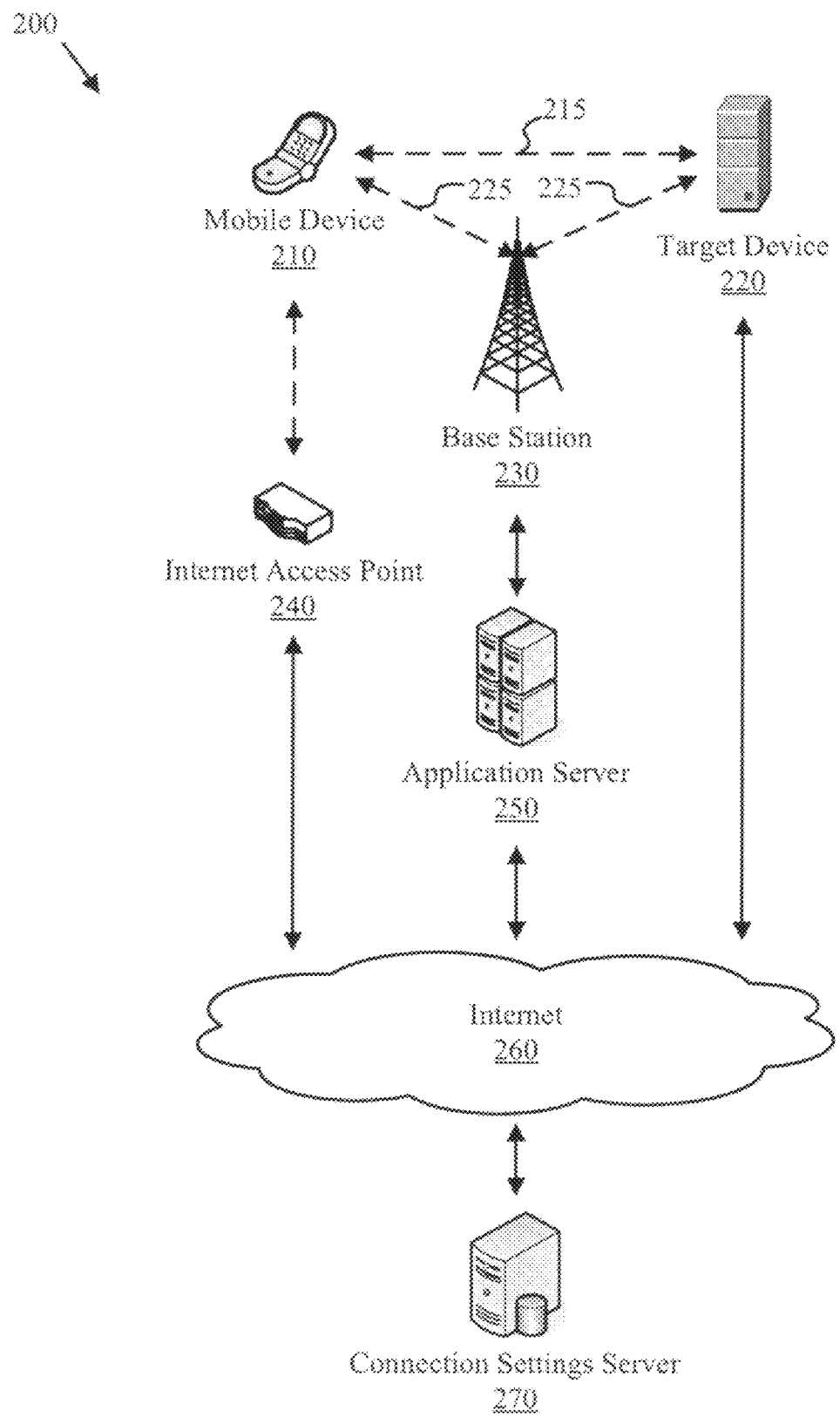
FIG. 2 is a more complex device-to-device connection system in accordance with one embodiment of the present invention.

FIG. 2 is a more complex device-to-device (D2D) connection system 200 in accordance with one embodiment of the present invention. The depicted system 200 includes a mobile device 210, a target device 220, a base station 230, an local internet access point 240, an application server 250, the Internet 260, and a connection settings server 270. As will be described in greater detail below, each embodiment of the present invention does not require the presence of all the depicted system 200 devices. Additionally, certain embodiments of the present invention may include additional networking devices congenial to performing the operations of the present invention and obtaining the benefits thereof. Indeed, it should be appreciated that the present invention may include a large variety of network configurations. The system 200 operates to provide device-to-device configuration settings data to the mobile device 210 so that a device-to-device connection between the mobile device 210 and the target device 220 might be established.

In certain embodiments, the target device 220 displays or advertises device-to-device availability data to a user of the mobile device 210. In some embodiments, the user of the mobile device 210 may enter the device-to-device availability data into the mobile device 210. The device-to-device availability data may include a phone number, a session initiation protocol (SIP) address, or a uniform resource indicator (URI) such as a uniform resource locator (URL), a uniform resource name (URN) or similar data. In some embodiments, a phone number entered by the user may include a special prefix to enable the mobile device 210 to distinguish the phone number from a regular phone number.

Those skilled in the art will appreciate that a URL may be a non-persistent way to uniquely identify an object within a namespace. Accordingly, a URL may be represented by the following example: transport://user:password@host:port/path. Similarly, those skilled in the art will appreciate that a URN may provide persistent names within a namespace. This may allow a permanent object to be mirrored over several known sites. For example, if one site were unavailable, the desired object may be found or resolved at another site. Furthermore, those skilled in the art would appreciate that a URI may include an abstraction of both URLs and URNs.

In some embodiments, the mobile device 210 is configured to translate the device-to-device availability data into a URL and use the URL to retrieve device-to-device connection settings data from the connection settings server 270. For example, if a user enters in a phone number, the mobile device 210 may be configured to translate the phone number into a URL. In certain embodiments, the mobile device 210 may be configured to generate and consider location information such as cell identity (ID), a country of the mobile device's current location, and location coordinate to determine an appropriate connection settings server 270 for retrieving appropriate device-to-device connection settings data. In certain embodiments, the connection settings server 270 may operate to determine which settings are appropriate for the mobile device 210 based on location information provided by the mobile device 210 (i.e., cell ID, country, and location coordinates). Such embodiments may include scenarios where multiple target devices are using the same phone number.

In some embodiments, the mobile device 210 may communicate with the connection settings sever 270 via the base station 230 (i.e., cellular network) or the internet access point 240 to retrieve device-to-device connection settings data. The connection settings server 270 may include a web services feature where target device operators may register and provide connection settings data.

In some embodiments, the message content of the connection settings request may include a URL or URN that includes a phone number. For example, such a phone number may be +358504829034 and a corresponding URL may be "358504829034.givemeradiosettings.comI." In certain embodiments, the message content of a connection settings request may include a URL that includes an SIP address. For example, the SIP address could be box32@directconnect.com, and the URL could be box32directconnectcom.givemeradiosettings.com. Accordingly, the content of the connection settings requests may take on a variety of data and data associations or arrangements.

The following is an example of how a connection settings request may be sent:

```
<MessageID GetRadioSetting,
    LocalDeviceNumber = 'number',
    LocalDeviceSIPAdress = 'SIP adress'
    LocalDeviceURL = 'URL'
    Location = 'Location Data'>
```

Examples of "Location Data" mentioned above may include, but are not limited to, geographical coordinates, a cell identity, and a photo of surrounding.

The following is an example of a response to a connection settings request may contain device-to-device connection settings (for n=2):

```
<Message ID = RadioSettings,
NumberOfRadios = 'n',
    radioSettings TYPE = WLAN,
    networkName = "WLAN network name",
    networkMode = Infrastructure/Ad-hoc,
    secureMode = Open/WEP/WPA,
    wepKey = "WEP key",
    wpaKey = "WPA key",
    radioSettings TYPE = Bluetooth,
    networkName = "Device Name",
    pairingKey = "key">
```

Additionally, the connection settings server 270 may include a webpage that includes objects that present the device-to-device connection settings data. The following is an example of a WLAN object that may be included in a webpage and provides the following exemplary device-to-device connection setting data:

```
<radioSettings TYPE = WLAN,
    networkName = "WLAN network name",
    networkMode = Infrastructure/Ad-hoc,
    secureMode = Open/WEP/WPA,
    wepKey = "WEP key",
    wpaKey = "WPA key">
```

The following is an example of a Bluetooth object that may be included in a webpage:

```
<radioSettings TYPE = Bluetooth,
    networkName = "Device Name",
    pairingKey = "key">
```

The following is an example of an LTE D2D object that may be included in a webpage:

```
<radioSettings TYPE = LTE D2D,
    localDeviceName = "Name of target device" (target
    device registers as local service with eNodeB by its
    local device name),
    serviceAdress   =   "LiveInConcert.rolling.stone.uk"
    (target device registers as local service with eNodeB
    using the service address),
    servingNetwork  =  Operator/eNodeB   ID   through
    which the target device may be contacted,
    localAPname    =    AP name of target device in case of
    standalone operation of target device
    ...Other means of addressing the target device>
```

Upon receiving the device-to-device connection settings data, the mobile device 210 may configure a device-to-device radio of the mobile device 210 and establish a device-to-device connection 215 with the target device 220. In certain embodiments, the target device 220 comprises a media server, and the mobile device 210 may begin receiving services from the target device 220 upon establishing the device-to-device connection 215. In some embodiments, a media server may be a mobile device. In some embodiments the target device 220 may be an access point to the internet.

In certain embodiments, the mobile device 210 may not translate the device-to-device connection availability data entered by the user. For example, where the device-to-device connection availability data is a phone number or SIP address, the mobile device 210 may refrain from translating the phone number or SIP address into a URL. Instead, the phone number or SIP address may be translated into a URL or a SIP uniform resource identity (URI) by the application sever 250, which operates as part of a cellular network. In such embodiments, the application server 250 may retrieve the device-to-device connection settings from the connection settings server 270 and then forward the settings to the mobile device 210.

In certain embodiments, the mobile device 210 may call a phone number of the target device 220, and the target device 220 may send the necessary settings to connect to the target device 220. In some embodiments, a short messaging service (SMS) text message, such as a text message containing, "settings," may be sent to the target device 220 instead of calling the target device 220. It should be noted that the target device itself does not always have to physically send the settings to the mobile device. In some embodiments, a service, such as a connection settings server 270 hosted by a target device manufacturer, a network operator, or a service operator, may operate to forward the settings to the mobile device 210.

In some embodiments, the mobile device 210 may automatically connect to the connection settings server 270 without a user entering device-to-device availability data. In such embodiments, the mobile device 210 may connect to the connections settings server 270 using an appropriate URL and may also communicate mobile device location data to the connections settings server 270. The connections settings server 270 may use the mobile device location data to return local connectivity settings to the mobile device 210 to enable the mobile device 210 to connect to one or more nearby target devices.

In some embodiments, the connection settings server 270 may include an internet portal or service portal, such as an Ovi server described below, having a list of target devices (i.e., media servers) that the mobile device 210 may search local to the location of the mobile device 210. In such embodiments, the service portal could also provide the device-to-device connection settings data to the mobile device 210. In other words, the connection settings server 270 may include a service portal that provides a list of media servers registered to the service portal and provides their URLs and their device-to-device connection settings respectively. Advantageously, this embodiment allows media servers may be found even if they otherwise would be in a deep net not easily recognized by the search engines.

Ovi is a Nokia internet portal for providing internet settings and services. For example, an Ovi server may provide links to local third parties, global third parties, and Nokia services. Ovi also has the capability to search for what a user might be looking for and present it to the user. For example, Ovi, and other such internet portals, could search for an available media server and present the media server along with D2D settings to the user. As such, a connection settings server 270 may be at least partially embodied as an Ovi server, in some embodiments of the present invention.

Accordingly, the connection settings server 270 may provide a search engine that is capable of searching media servers with a local scope filter (based on mobile device location data provided by the mobile device 210), find relevant target devices 220, and define device-to-device connection settings for the target devices 220. In certain embodiments, a local scope filter may, for example, restrict devices within certain distance (e.g. 100 m), same cell, same city, same district or county, and so on. Additionally, default names may be used to specify the location or to limit the scope (e.g., only to Oxford-Street-Building-2, only to home, only to MyTVs, and so on) with implication that the local scope is limited to the devices available in the named location, such as HPxyz1printer@OxfordStreet-Building-2, or MyVideo-Camerajvcxxx, MyVideoCameraOldCanon@home, and so on. Scope may further be limited only to some devices available at the named location, for example only MyTV@home and not the FamilyTV@home. Additionally, mnemonics may also be used to define the local scope. For example, within a subnet:

```
Intra scope;
    File Server: \\server
        Home Directory: \\server\homedirectory
```

In some embodiments, a local scope filter may also include a global-like search for local devices. A global-like search may include a variety of parameters depending on the search being performed. For example, a global-like search may include a search for a device, a database, or an office.

An example of a global-like search for devices may include a scenario where a user searches for a nearby device, such as a bankomat or automated teller machine (ATM). The user may not care to which bank the ATM corresponds, but would like to avoid an overflow of hits. In such an example, the user may enter a request to find all ATMs within 100 meters of the user's current location. Such a request may include the following:

Device: bankomat [current location, radius 100 m]

Once the user retrieves a list of ATMs that comply with the foregoing search parameters, device-to-device configuration settings may also be received and the user may select an ATM from the lists to establish a device-to-device connection therewith. In case the first in the list is not found, the second or third may give a better hit for device-to-device connection as their radio locations may be closer than the one at the top of the list, which is the nearest in location. Accordingly, the local scope filter may operate to greatly facilitate location of specified devices.

An example of a global-like search for a database may include a scenario where a user would like to establish a device-to-device connection with a database and the user knows a brand or product name corresponding to the database. For example, a user may want to establish a device-to-device connection with a Mediabank database (by Oracle). In different countries, the Mediabank contents may be partly different and even the local variant of the Mediabank name may differ slightly. Here, if the user knows the Mediabank name (by Oracle), the user would not need to know exactly what he is looking for and where, but any list of the nearest would be sufficient.

If the user receives a list, but cannot immediately establish a device-to-device connection with the listed devices, the user may receive a hit that the service is available by device-to-device connection at, for example, a building opposite of a street where the user is located. Consequently, the user could cross the street and establish the desired device-to-device connection. Additionally, if the user knows, or has reason to suspect, that the desired database might be at a particular venue, such as a High Tech Center, and Alma Media, or an Itella, the user may enter parameters to further filter the search results. Such a request may include the following:

Database: https://mediabank.oracle.com [service point|Alma Media|Itella]

As such, the user may guess or be aware that the Mediabank could be available at the local High Tech Center building, a famous media house, or at a state post building, but would not need to know exactly where the Mediabank is located. Accordingly, the local scope filter may be very flexible in the manner in which the local scope filter aids the user in establishing a device-to-device connection with a desired target device.

An example of a global-like search for an office may include where a user desires to access an office of an airline company. In such an example, the user may input filtering attributes or parameters of a preference regarding an office of Finnair, and secondarily, if that is not found, any office of any airline company in the same OneWorld alliance He may also extend the search to competing companies if he just needs the service and is willing to make an exception to his traveling conventions. Such a request may include the following:

Office: airport-service [Hki-city-area, Finnair office|any OneWorld office|any Star Alliance office, search in preference order and sort by radius to current location Accordingly, the local scope filter, in certain embodiments, may enable a user to search for a variety of offices depending on attributes and parameters inputted by the user.

Accordingly, the present invention enables the establishment of a device-to-device connection between a mobile device 210 and a target device 220 in a variety of ways.

Figure 3:
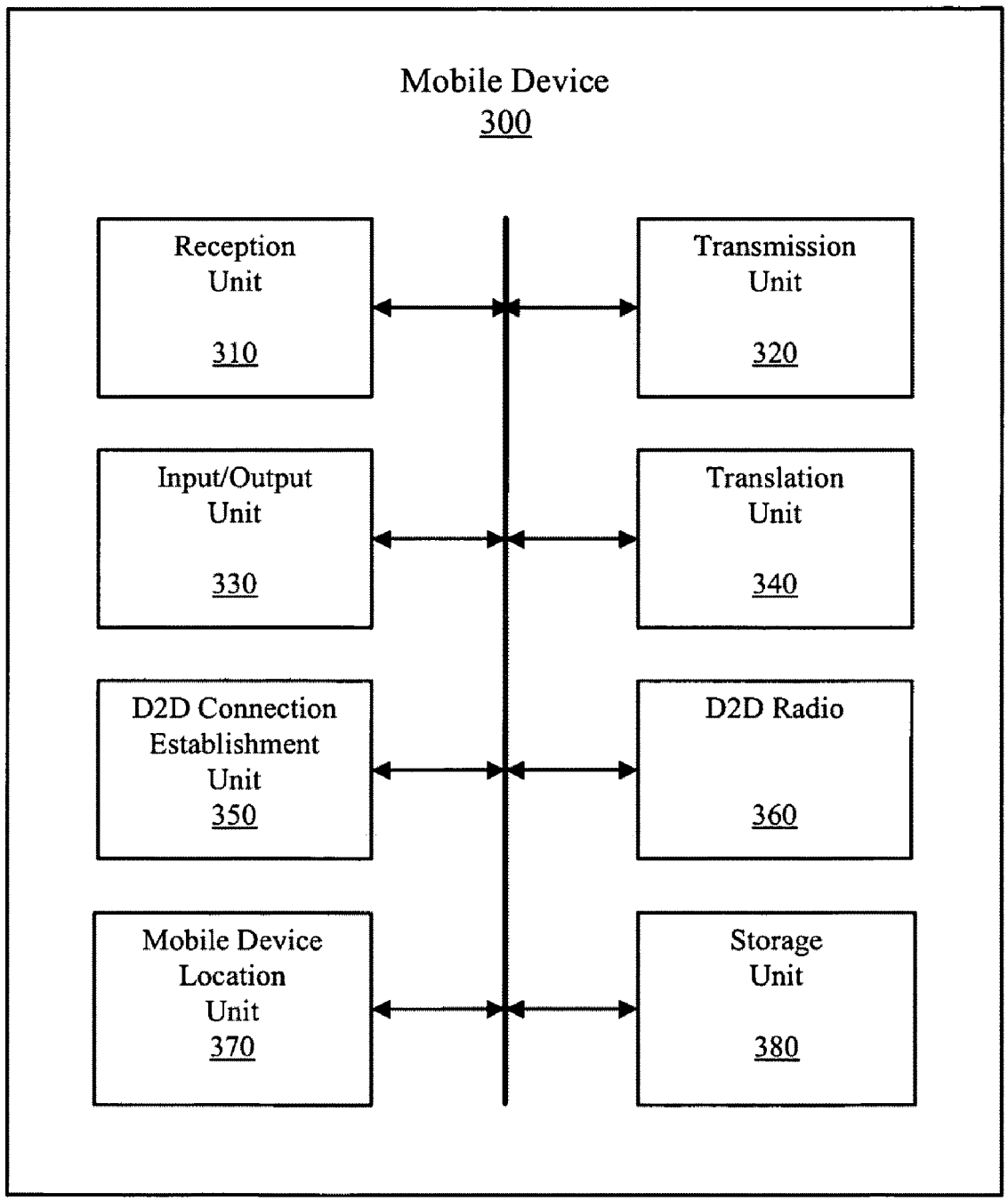
FIG. 3 is a mobile device in accordance with one embodiment of the present invention.

FIG. 3 is a mobile device 300 in accordance with one embodiment of the present invention. The depicted mobile device 300 includes a reception unit 310 (or receiver), a transmission unit 320 (or transmitter), an input/output unit 330, a translation unit 340, a device-to-device (D2D) connection establishment unit 350, a D2D radio 360, a mobile device location unit 370, and a storage unit 380. In some embodiments, the mobile device 300 corresponds to the mobile device 110 of FIG. 1 and/or the mobile device 210 of FIG. 2. It should be appreciated that not all embodiments of mobile devices of the present invention require all of the units depicted in mobile device 300. Additionally, it should be appreciated that the units depicted in mobile device 300 are not intended to be an exhaustive presentation of all units, features, and/or components of a mobile device in accordance with the present invention. The mobile device 300 operates to receive device-to-device connection settings data from a connection setting server (not shown) and use the settings data to establish a device-to-device connection with a target device (also not shown).

In certain embodiments, the transmission unit 320 is configured to transmit a request for device-to-device connection settings. In some embodiments, such a transmission may be via a local area network or a cellular network. Additionally, the request may include a phone number, a session initiation protocol (SIP) address, or a uniform resource locator (URL), or uniform resource name (URN) that has been inputted by a user. In some embodiments, the request may include the mobile device 300 calling the target device as described above. As such, the present invention enables a user to initiate the establishment of a device-to-device connection in a manner well known to even the least of technologically savvy users (i.e., by entering in a phone number or providing the phone number through voice input). Additionally, though some embodiments of the present invention include a user initiated retrieval of device-to-device connection settings data, other embodiments provide for automatically retrieving device-to-device connection settings data.

In some embodiments, the reception unit 310 may be configured to receive device-to-device connection settings from a connection settings server. In some embodiments, the reception unit may receive the connection settings via a local area network connection or a cellular network connection. Device-to-device connection settings may include a variety of data such as a radio technology type (i.e., long term evolution (LTE) D2D radio, WLAN, or Bluetooth), WLAN access point settings, an encryption method, encryption keys, Bluetooth pairing keys, and settings for multiple radio technologies. Accordingly, the present invention provides a solution for obtaining device-to-device connection settings in a manner that does not require a user to manually input the settings.

In some embodiments, the input/output unit 330 is configured to enable a user to enter device-to-device connection availability data. As such, the input/output unit 330 may include a key pad, touch pad, or other user data entry apparatus. The input/output unit 330 may also include a display component such as an electronic screen configured to display data to a user. Such data may include a list of nearby target device to which the mobile device 300 may connect. Accordingly, some embodiments of the present invention enable a user to participate in the device-to-device connection establishment process.

In certain embodiments, the translation unit 340 may be configured to translate a phone number or SIP address into a URL. In certain embodiments, the URL may be used by mobile device 300 to receive and/or retrieve the device-to-device connection settings data. In certain embodiments, a translation of a phone number or SIP address into a URL may not be necessary, especially if a user initially enters the URL into the mobile device, and the translation unit 340 may be configured to determine whether a translation is necessary. In some embodiments, the mobile device 300 does not include a translation unit 340 as such a translation may be performed by an application server as described in FIG. 2. In such embodiments, an application server may actually translate a phone number or SIP address into an SIP uniform resource identity (URI) and retrieve device-to-device connection settings data on behalf of the mobile device 300. As such, even though locating device-to-device connection settings may require or at least be facilitated by a proper URL, the present invention, in some embodiments, may only require a user to enter a phone number.

The D2D connection establishment unit 350 may be configured to use device-to-device connection settings data to establish a device-to-device connection with a target device. In some embodiments, the D2D connection establishment unit 350 may select a best suited technology for establishing the device-to-device connection and/or select between a plurality of potential target devices. Determination of the best suited technology may be at least partially based on a wide variety of data such as device-to-device connection settings data, a low price per bit value, a highest data rate value, a user prompted or selected technology, a user preference, or user profile data. In some embodiments, establishment of the device-to-device connection may include the D2D connection establishment unit 350 configuring the D2D radio 360 according to the device-to-device connection settings data. In certain embodiments, the D2D radio may include a short range radio. Accordingly, the present invention not only provides a self-configuring solution for device-to-device connection establishment, but also solution that may cater to distinct technologies.

In some embodiments, the mobile device location unit 370 may be configured to generate mobile device location data. It should be appreciated that the mobile device location data may include a variety of data such as one or more cell identities of base stations to which the mobile device is connected, a country, region, state, city, or town where the mobile device is located, or geographic locations corresponding to the mobile device. Mobile device location data may be used by the mobile device 300 to determine an appropriate connection settings server for retrieving device-to-device, or to enable a connection settings server to determine potential target devices geographically near the mobile device 300. The mobile device location data may also enable a connection settings sever to determine appropriate device-to-device connection settings data for the mobile device 300. Accordingly, the present invention enables a mobile device and/or connection settings server to intelligently make decisions based on a location of the mobile device 300.

In some embodiments, the storage unit 380 is configured to store one or more data structures and/or commands for performing the operations described herein. One skilled in the art will appreciate that the storage 380 unit may include a large variety of computer-readable mediums such as volatile or non-volatile memory storing one or more computer programs. Accordingly, the units 310-380 of the mobile device 300 cooperate to receive device-to-device connection settings data from a connection setting server and use the settings data to establish a device-to-device connection with a target device.

Figure 4:
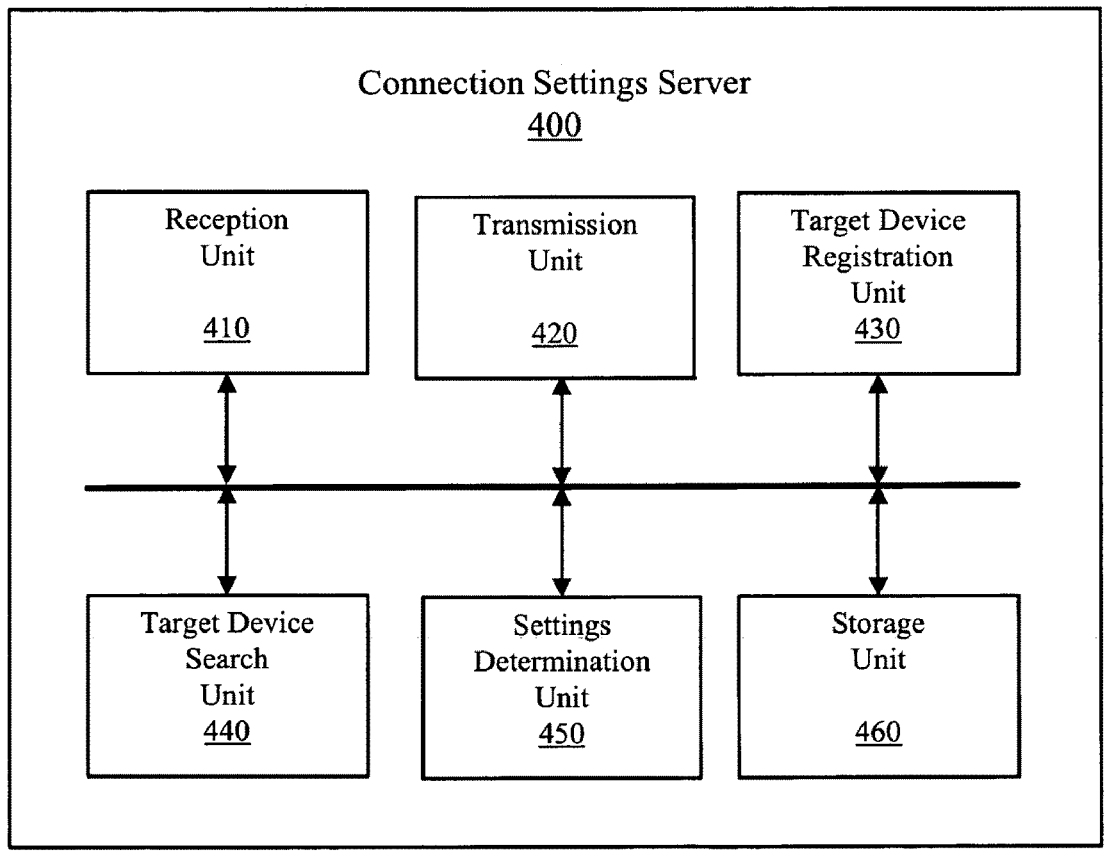
FIG. 4 is a connection settings server in accordance with one embodiment of the present invention.

FIG. 4 is a connection settings server 400 in accordance with one embodiment of the present invention. The depicted connection settings server 400 includes a reception unit 410 (or receiver), a transmission unit 420 (or transmitter), a target device registration unit 430, a target device search unit 440, a settings determination unit 450, and a storage unit 460. In some embodiments, the connection settings server 400 corresponds to the connection settings server 140 of FIG. 1 and/or connection settings server 270 of FIG. 2. It should be appreciated that not all embodiments of connection settings servers of the present invention require all of the units depicted in connection settings server 400. Additionally, it should be appreciated that the units depicted in connection settings server 400 are not intended to be an exhaustive presentation of all units, features, and/or components of a connection settings server in accordance with the present invention.

In certain embodiments, the reception unit 410 is configured to receive a request for device-to-device connection settings data. In some embodiments, the reception unit 410 may also receive mobile device location data such as one or more cell identities (IDs), a country, or coordinates. In some embodiments, the settings determination unit 450 is configured to determine appropriate device-to-device connection settings data corresponding to the request received by the reception unit 410. In certain embodiments, determination of appropriate device-to-device connection settings data may be based, at least in part, on the mobile device location data received by the reception unit 410.

In certain embodiments, the target device registration unit 430 may be configured to register target devices with the connection settings server. For example, a media server manufacturer may communicate with the connection settings server 400 to register the media server so that mobile devices may obtain connection settings data from the connection settings server 400 and thereby establish a device-to-device connection with the media server. In some embodiments, registration of target devices may be performed via a web interface. As such, the present invention provides a user-friendly solution for enabling entities, such as media server manufacturers to participate in, and benefit from, device-to-device connection systems.

In some embodiments, the target device search unit 440 may be configured to generate a list of registered target devices. In some embodiments, generation of the list of registered target devices is based on mobile device location data received by the reception unit 410. In certain embodiments, the transmission unit 420 may be configured to transmit the list of registered target devices to a mobile device. Accordingly, the present invention provides a solution for enabling a mobile device to select a particular target device amongst a plurality of potential target devices that are registered with the connection settings server 400.

In some embodiments, the target device search unit 440 is configured to search for target devices using a local scope filter. The local scope filter may be based, at least in part, on mobile device location data received from a mobile device. In certain embodiments, potential target device data resulting from the filtered search may be used to determine appropriate device-to-device connection settings data and/or be transmitted to a mobile device by the transmission unit 420. As such, the present invention provides a solution for enabling a user to select a target device amongst a plurality of target devices, without requiring target devices, or the user/operator thereof, to register with the connection settings server 400.

It should be appreciated that the connection settings server 400 may include, be embodied by, or at least partially comprise, a variety of network capable devices such as a web server or an internet or service portal, such as an Ovi server (i.e., the Nokia Ovi). In some embodiments, the appropriate device-to-device connection settings data may be included within a webpage that is served up by the connection settings server 400. In such embodiments, receiving a request, determining appropriate device-to-device connection settings data, and transmitting the device-to-device connection settings data may be embodied by serving up a webpage to a mobile device. Accordingly, the connection settings server 400 may be embodied by a variety of network devices.

In some embodiments, the storage unit 460 is configured to store one or more data structures and/or commands for performing the operations described herein. One skilled in the art will appreciate that the storage 460 unit may include a large variety of computer-readable mediums such as volatile or non-volatile memory storing one or more computer programs. Accordingly, the units 410-460 of the connection settings server 400 cooperate to provide appropriate device-to-device connection settings data to mobile devices to enable mobile devices to establish device-to-device connections with target devices such as media servers.

Figure 5:
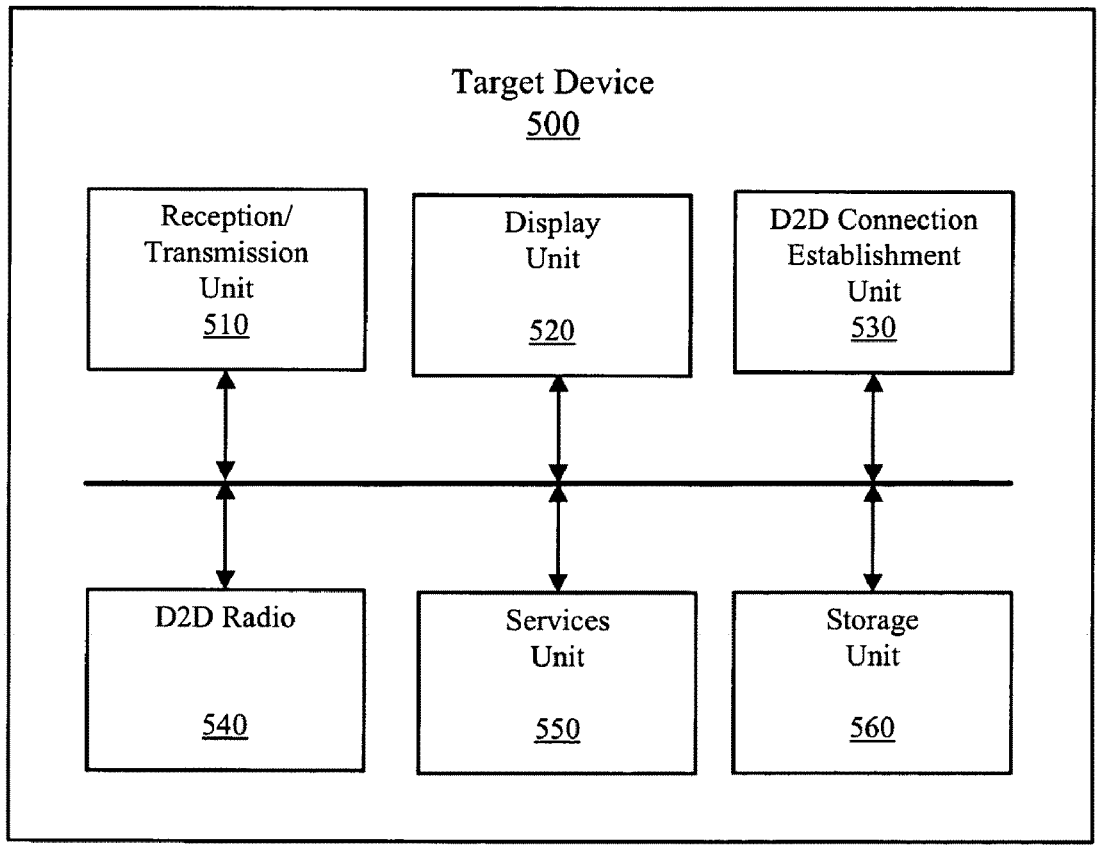
FIG. 5 is a target device in accordance with one embodiment of the present invention.

FIG. 5 is a target device 500 in accordance with one embodiment of the present invention. The depicted target device 500 includes a reception/transmission unit 510 (or receiver/transmitter), a display unit 520, a D2D connection establishment unit 530, a D2D radio 540, a services unit 550, and a storage unit 560. In certain embodiments, the target device 500 corresponds to the target device 120 of FIG. 1 and/or the target device 220 of FIG. 2. It should be appreciated that not all embodiments of target devices of the present invention require all of the units depicted in target device 500. Additionally, it should be appreciated that the units depicted in target device 500 are not intended to be an exhaustive presentation of all units, features, and/or components of a connection settings server in accordance with the present invention. Indeed, the target device 500 may also include other units, features, and/or components necessary or beneficial for operating in the networking environment disclosed herein. In some embodiments, the target device 500 is a media server. In certain embodiments, the units 510-550 of the target device 500 operate to establish a device-to-device connection with one or more mobile devices.

In certain embodiments, the reception/transmission unit 510 may be configured to communicate with a cellular network to send and receive data. In certain embodiments, the reception/transmission unit 510 may cooperate with, for example, the D2D connection establishment unit 530 and the D2D radio to facilitate or enable device-to-device connections. As such, a target device may include a network device that is fully functional in a cellular network environment.

The display unit 520 may be configured to display device-to-device connection availability data. In some embodiments, the display unit 520 comprises an electronic display configured to display, for example, a phone number, a session initiation protocol (SIP) address, and/or a uniform resource locator (URL). In certain embodiments, the target device 500 does not include a display unit, but may display the device-to-device connection availability data on a printed label. As described elsewhere, a mobile device user may see the device-to-device connection availability data (i.e., a phone number) and enter the device-to-device connection availability data in a mobile device to initiate any one of the device-to-device connection processes disclosed herein. Accordingly, the target device 500 may facilitate device-to-device establishment by displaying information used in a mobile device request for a device-to-device connection by displaying information used in a mobile device request for device-to-device connection settings data.

In certain embodiments, the D2D connection establishment unit 530 may be configured to establish a device-to-device connection with one or more mobile devices. In certain embodiments, the D2D connection establishment unit 530 may establish the device-to-device connection by configuring and/or using the D2D radio 540. In some embodiments, the D2D connection establishment unit may use the D2D radio 540 to transmit device-to-device connection settings data directly to a mobile device, whereupon the mobile device may self-configure and establish a device-to-device connection with the target device. In certain embodiments, the target device 500 may transfer the transmit device-to-device connection settings data in response to a mobile device calling the target device. As such, the target device 500 may enable and facilitate the establishment of a device-to-device connection between a mobile device and the target device 500.

In certain embodiments, the services unit 550 is configured to provide services to a mobile device. As mentioned above, it should be appreciated that the target device 500 may provide a large variety of services. Such services may include downloading promotional material or uploading videos and pictures during a public event such as a music concert or sporting event. Additionally, such services may include downloading tourist information including maps, schedules, promotional materials, pictures of tourists, and pictures of attractions. Furthermore, such services may include accessing shopping related information such as store locations, sales, and hours of operation. Consequently, the present invention not only enables device-to-device connections between mobile devices and target devices, but the present invention also enables various services to be provided via the device-to-device connection.

In some embodiments, the storage unit 560 is configured to store one or more data structures and/or commands for performing the operations described herein. One skilled in the art will appreciate that the storage 560 unit may include a large variety of computer-readable mediums such as volatile or non-volatile memory storing one or more computer programs. Accordingly, the units 510-560 of the target device 500 operate to establish a device-to-device connection with one or more mobile devices and provide services thereto.

Figure 6:
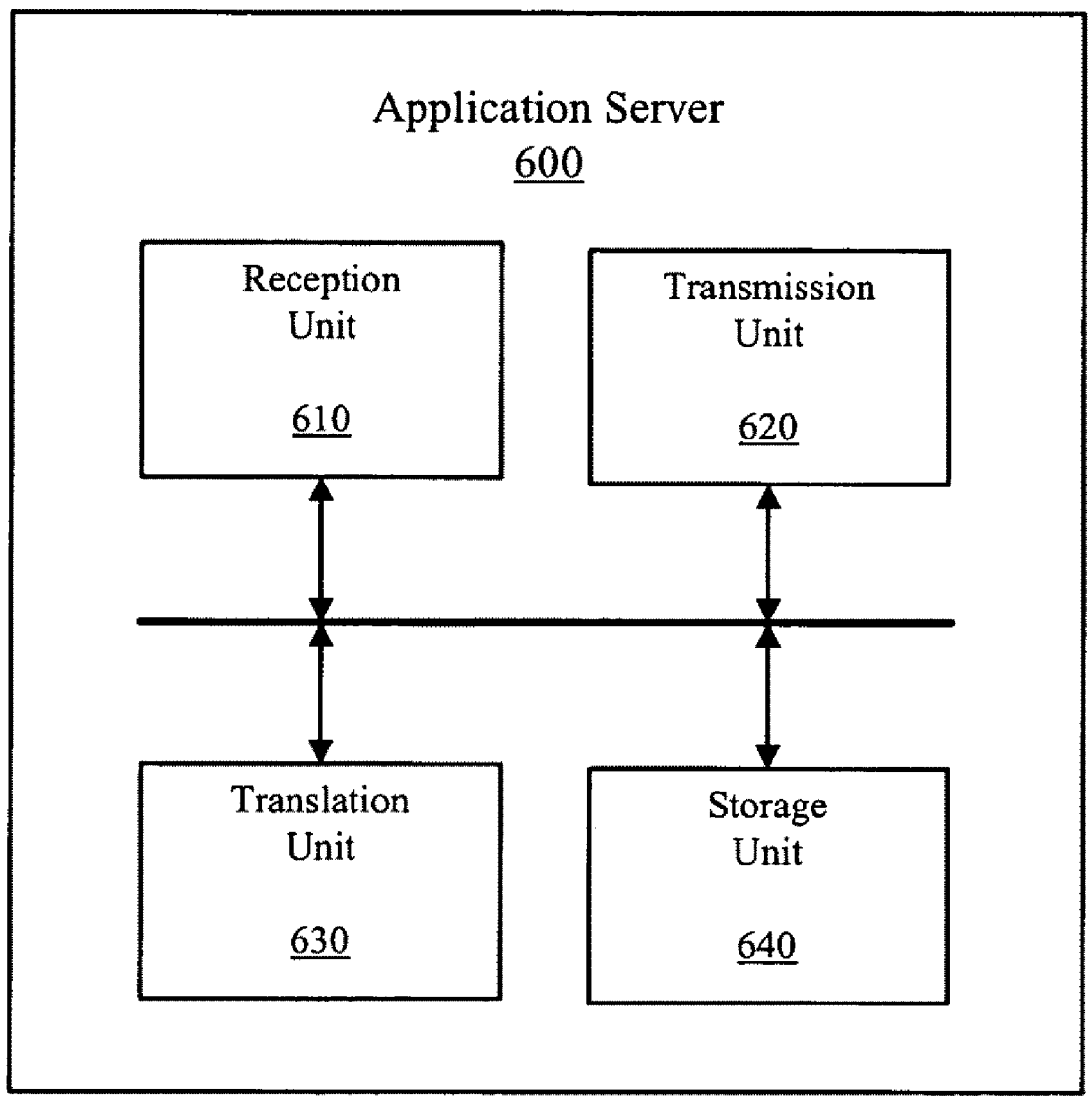
FIG. 6 is an application server in accordance with one embodiment of the present invention.

FIG. 6 is an application server 600 in accordance with one embodiment of the present invention. The depicted application server 600 includes a reception unit 610, a transmission unit 620, a translation unit 630, and a storage unit 640. In certain embodiments, the application server 600 corresponds to the application server 250 of FIG. 2. It should be appreciated that not all embodiments of application servers of the present invention require all of the units depicted in application server 600. Additionally, it should be appreciated that the units depicted in application server 600 are not intended to be an exhaustive presentation of all units, features, and/or components of a connection settings server in accordance with the present invention. Indeed, the application server 600 may also include other units, features, and/or components necessary or beneficial for operating in the networking environment disclosed herein. In some embodiments, the application server 600 is part of a core network of a cellular network. In certain embodiments, the units 510-560 of the target device 500 operate to establish a device-to-device connection with one or more mobile devices.

In certain embodiments, the reception unit 610 is configured to receive a request, in the form of a phone number and/or phone call, from a mobile device for device-to-device connection settings data. In some embodiments, the translation unit 630 may be configured to translate at least a portion of the request, such as a phone number, into second request data, which may include a uniform resource identity (URI). For example, in some embodiments, the translation unit 630 may be configured to translate a phone number of the request received from the mobile device into a session initiation protocol (SIP) uniform resource identity (URI). In certain embodiments, translation of the phone number into a SIP URI may be performed in accordance with, for example: Falstrom, P., "The E.164 to Uniform Resource Identifiers (URI) Dynamic Delegation Discovery System (DDDS) Application (ENUM)", RFC 3761, April 2004. It should be appreciated that the application server 600 may operate in accordance with a variety of different protocols depending upon the interests and needs of a particular embodiment. Accordingly, an application server 600 may simplify the operations performed by the mobile devices by performing the translation and retrieving the device-to-device connection settings data.

In some embodiments, the reception unit 610 and the transmission unit 620 may cooperate to retrieve device-to-device connection settings data from a connection settings server using the SIP URI. In certain embodiments, the transmission unit 620 may be configured to transmit the device-to-device connection settings data to the mobile device. Accordingly, the application server 600 may retrieve device-to-device connection setting data on behalf of the mobile device.

In some embodiments, the storage unit 640 is configured to store one or more data structures and/or commands for performing the operations described herein. One skilled in the art will appreciate that the storage 640 unit may include a large variety of computer-readable mediums such as volatile or non-volatile memory storing one or more computer programs. Accordingly, the units 610-640 of the application server 600 operate to receive a phone number from a mobile device, to translate the phone number into an SIP URI, to retrieve device-to-device connection settings data, and to transmit the device-to-device connection settings data to the mobile device.

It should be noted that many of the functional units described in this specification have been presented as units in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

Figure 7:
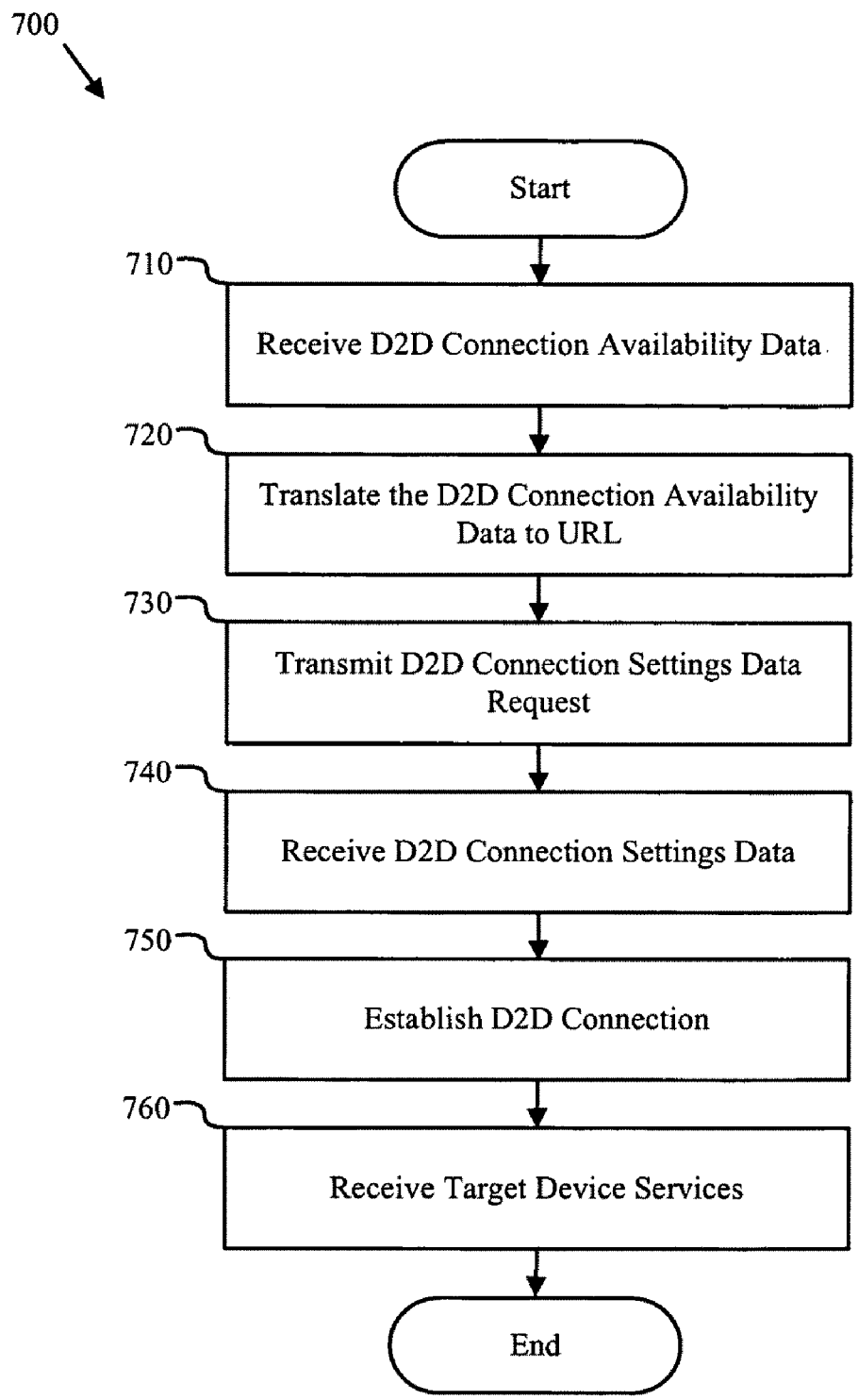
FIG. 7 is a flow chart diagram of a method for a mobile device establishing a device-to-device connection in accordance with one embodiment of the present invention.

FIG. 7 is a flow chart diagram of a method 700 for a mobile device establishing a device-to-device connection in accordance with one embodiment of the present invention. The depicted method includes receiving 710 device-to-device (D2D) connection availability data, translating 720 the D2D connection availability data to a URL, transmitting 730 a D2D connection settings data request, receiving 740 D2D connection settings data, establishing 750 a D2D connection, and receiving 760 target device services. In certain embodiments, the operations 710-760 of the method 700 are performed by a mobile device such as the mobile devices of FIG. 1-3. The operations 710-750 of the method 700 provide one example of a series of operations that a mobile device may perform in order to establish a device-to-device connection with a target device.

Receiving 710 D2D connection availability data may include a mobile device receiving data from a user inputting data into the mobile device. In some embodiments, the D2D connection availability data may include a phone number, a session initiation protocol (SIP) address, or a uniform resource locator (URL). As will be shown by the operations of the method 700 that follow, in some embodiments, the only action that the present invention requires from a user is to enter, for example, a phone number. Accordingly, the present invention provides a solution for establishing a device-to-device connection that, in some embodiments, only requires the user to enter a phone number into the mobile device.

Translating 720 the data into a URL may include a mobile device translating a phone number or an SIP address entered by a user into a URL. In certain embodiments of the present invention, the translating 720 operation is not performed by the mobile device; rather, the translating may be performed by another network device such as an application server of a cellular network. In some embodiments, the D2D connection availability data may be a URL entered into a user device by a user. In such embodiments, there may be no need to perform the translating 720 operation. Accordingly, even though the present invention may, in some embodiments, only require a user to enter a phone number into a mobile device, the present invention may benefit from URL related technology by providing a solution for translating a phone number into a URL.

Transmitting 730 a D2D connection settings data request may include a mobile device transmitting a request to a connection settings server that includes the URL generated by the translating 720 operation. In certain embodiments, the transmitting 730 may include transmitting mobile device location data, which may include a cell identity, a country, and/or mobile device location coordinates. In some embodiments, the receiving 710 and the translating 720 are not required to setup a device-to-device connection. In such embodiments, the mobile device may automatically transmit 730 a D2D connection settings data request to a connection settings server without user participation. In some embodiments, the transmitting 730 may include calling the target device.

In embodiments, where the translating 720 is performed by an application server instead of the mobile device, the transmitting 730 of the D2D connection settings data request may include providing an application server with a phone number of the target device. In certain embodiments, the transmitting 730 may include transmitting the request via an internet gateway, such as the internet access point 240 of FIG. 2. In some embodiments, the transmitting 730 may include transmitting the request via a cellular network. Accordingly, the present invention enables the transmission of a request for D2D connection settings data via various routes.

Receiving 740 D2D connection settings data may include a mobile device receiving device-to-device connection settings data from connection settings server such as the connection settings server of FIGS. 1-2 and 4. In some embodiments, the receiving 740 may include receiving device-to-device connection settings from an application server or directly from a target device. Similar to the transmitting 730 operation, the receiving 740 of connection settings data may include receiving the settings data via a local internet access point or via a cellular network. Accordingly, the present invention enables a mobile device to communicate with a connection settings server in various ways.

Establishing 750 a D2D connection may include a mobile device establishing a device-to-device connection with a target device. In some embodiments, establishing 750 may include a mobile device using a D2D radio (i.e., a short range radio). After the D2D connection is established 750, the method 700 continues by receiving 760 target device services. In some embodiments, the receiving 760 may include uploading and/or downloading data to/from a media server. As described elsewhere, the target device services may include a large variety of services. Accordingly, the method 700 provides one example of a method 700 for a mobile device to establish a device-to-device connection and receive target device services.

Figure 8:
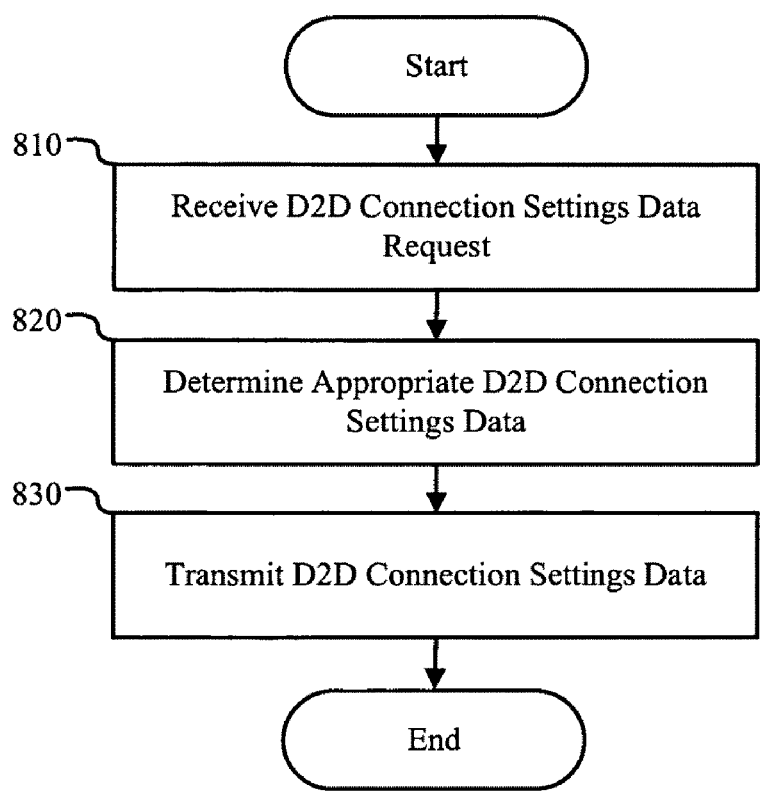
FIG. 8 is a flow chart diagram of a method for a connection settings server receiving a request for connection settings and transmitting the connection settings in accordance with one embodiment of the present invention.

FIG. 8 is a flow chart diagram of a method 800 for a connection settings server receiving a request for connection settings and transmitting the connection settings in accordance with one embodiment of the present invention. The depicted method 800 includes receiving 810 a device-to-device (D2D) connection settings data request, determining 820 appropriate D2D connection settings, and transmitting 830 D2D connection settings data. In certain embodiments, the method 800 is performed by a connection settings server such as the connection settings server of FIGS. 1-2 and 4. The operations 810-830 of the method 800 provide one example of a series of operations for receiving a request for connection settings data and returning connection settings data in response thereto.

Receiving 810 may include a connection settings server receiving a request from a mobile device. In certain embodiments, the request may be from an application server of a cellular network such as the application server of FIGS. 2 and 6. In some embodiments, the D2D connection settings data request may include a uniform resource locator (URL).

Determining 820 appropriate D2D connection settings data may include a connection settings server determining or locating connection settings data based on a URL received in a request for connection settings data. In certain embodiments, the determining 820 of the appropriate D2D connection settings data may include generating a list of registered target devices based on the mobile device location data. In some embodiments, the determining 820 of the appropriate D2D connection settings data may include searching for target devices using a local scope filter corresponding to the mobile device location data. Accordingly, certain embodiments of the method 800 rely on mobile device location data when determining what D2D connection settings data is appropriate for a particular mobile device.

Once the appropriate D2D connection settings data is located or determined, the method 800 may continue by transmitting 830 the D2D connection setting data to a mobile device. In certain embodiments, the transmitting 830 may include transmitting D2D connection settings data to an application server operating on behalf of a mobile device. Accordingly, the method 800 provides one example of a sequence of operations for a connection settings server receiving a request for connection settings, determining the appropriate connection settings, and transmitting the connection settings to a mobile device.

Figure 9:
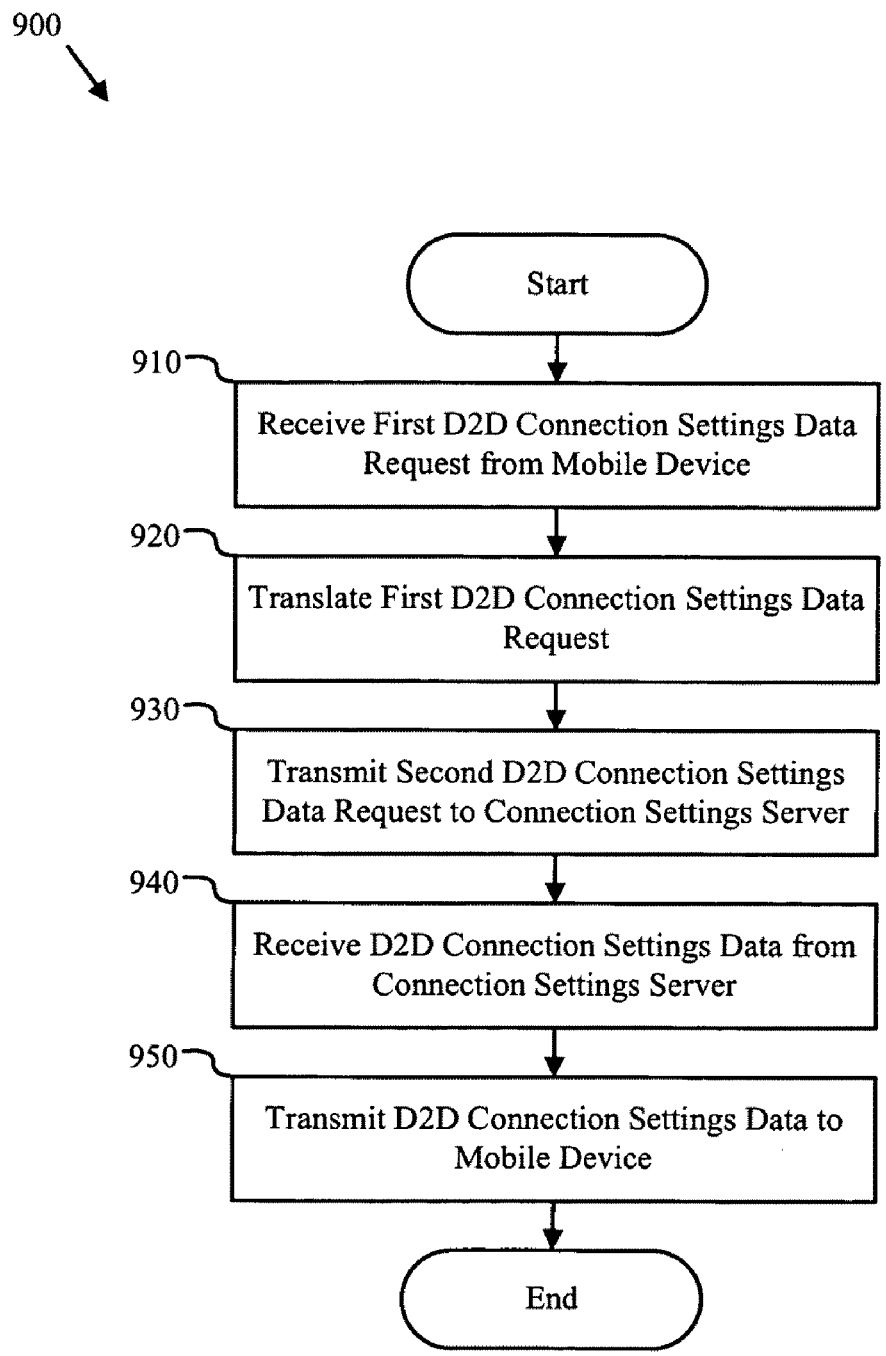
FIG. 9 is a flow chart diagram of a method for an application server operating on behalf of a mobile device in accordance with one embodiment of the present invention.

FIG. 9 is a flow chart diagram of a method 900 for an application server operating on behalf of a mobile device in accordance with one embodiment of the present invention. The depicted method 900 includes receiving 910 a first device-to-device connection settings data request from a mobile device, translating 920 the request, transmitting 930 a second device-to-device connection settings data request, receiving 940 device-to-device connection settings data, and transmitting 950 device-to-device connection settings data to a mobile device. In certain embodiments, the method 900 is performed by an application server of a cellular network, such as the application server of FIG. 2 and 6. The operations 910-950 of the method provide one approach for an application to operate on behalf of a mobile device.

Receiving 910 may include an application server of a cellular network receiving a phone number from a mobile device. Translating 920 the request may include the application server translating a phone number in a request for device-to-device connection setting data into a uniform resource locator (URL). Transmitting 930 a second device-to-device connection settings data request may include an application server transmitting a request for connection settings to a connection settings server. Receiving 940 device-to-device connection settings data may include an application server receiving connection settings data in response to the transmitting 930. Transmitting 950 may include an application server transmitting the settings data received during the receiving 950 to a mobile device. In some embodiments, the settings data enables the mobile device to establish a device-to-device connection with a target device.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

We claim:

1. A method, comprising:
transmitting, by a mobile device, a device-to-device connection settings request comprising mobile device location data of the mobile device;
receiving device-to-device connection settings data determined based on selected target devices using a local scope filter corresponding to the mobile device location data of the mobile device, wherein the local scope filter restricts target devices that can be selected based on a location, and wherein the local scope filter comprises a global-like search for local devices; and
establishing a device-to-device connection with a target device,
wherein the establishing of the device-to-device connection is facilitated by the device-to-device connection settings data.

2. The method of claim 1, further comprising:
receiving device-to-device connection availability data inputs from a user, wherein the device-to-device connection availability data is configured to enable the transmitting of the request.

3. The method of claim 2, further comprising:
translating the device-to-device connection availability data into a uniform resource locator.

4. The method of claim 1, wherein the transmitting of the request comprises automatically transmitting the request.

5. The method of claim 1, wherein the establishing of the device-to-device connection comprises selecting a best-suited radio technology for the establishing of the device-to-device connection.

6. The method of claim 1, wherein the transmitting and receiving comprise transmitting and receiving via a public wireless network.

7. The method of claim 1, wherein the transmitting and receiving comprise transmitting and receiving via a local access network.

8. The method of claim 1, wherein transmitting and the receiving comprise transmitting and receiving via a cellular network.

9. The method of claim 1, wherein the request comprises at least one of a phone number, a session initiation protocol address, and a uniform resource locator.

10. An apparatus, comprising:
a transmission unit configured to transmit a request for device-to-device connection settings, wherein the request comprises mobile device location data of the apparatus;
a reception unit configured to receive device-to-device connection settings data determined based on selected target devices using a local scope filter corresponding to the mobile device location data of the apparatus, wherein the local scope filter restricts target devices that can be selected based on a location, and wherein the local scope filter comprises a global-like search for local devices; and
a connection establishment unit configured to establish a device-to-device connection with a target device,
wherein establishment of the device-to-device connection is facilitated by the device-to-device connection settings data.

11. The apparatus of claim 10, further comprising:
an input/output unit configured to receive device-to-device connection availability data inputs from a user, wherein the device-to-device connection availability data is configured to enable transmission of the request.

12. The apparatus of claim 11, further comprising:
a translation unit configured to translate the device-to-device connection availability data into a uniform resource locator.

13. The apparatus of claim 10, wherein the transmission unit is configured to automatically transmit the request.

14. The apparatus of claim 10, wherein the connection establishment unit is configured to select a best-suited radio technology for establishment of the device-to-device connection.

15. The apparatus of claim 10, further comprising:
a mobile device location unit configured to communicate the mobile device location data configured to enable the establishing of the device-to-device connection with a selected target device.

16. The apparatus of claim 10, wherein the transmission unit and the reception unit are configured to transmit the request and receive the device-to-device connection settings data via a public wireless network.

17. The apparatus of claim 10, wherein the transmission unit and the reception unit are configured to transmit the request and receive the device-to-device connection settings data via a local access network.

18. The apparatus of claim 10, wherein the transmission unit and the reception unit are configured to transmit the request and receive the device-to-device connection settings data via a cellular network.

19. The apparatus of claim 10, wherein the request comprises at least one of a phone number, a session initiation protocol address, and a uniform resource locator.

20. An apparatus, comprising:
means for transmitting a request for device-to-device connection settings, wherein the request comprises mobile device location data of the apparatus;
means for receiving device-to-device connection settings data determined based on selected target devices using a local scope filter corresponding to the mobile device location data of the apparatus, wherein the local scope filter restricts target devices that can be selected based on a location, and wherein the local scope filter comprises a global-like search for local devices; and means for establishing a device-to-device connection with a target device, wherein the establishing of the device-to-device connection is facilitated by the device-to-device connection settings data.

21. A computer program embodied on a non-transitory computer-readable medium stored on a mobile device, the computer program configured to control a processor to perform operations comprising:

transmitting a device-to-device connection settings request comprising mobile device location data of the mobile device;

receiving device-to-device connection settings data determined based on selected target devices using a local scope filter corresponding to the mobile device location data of the mobile device, wherein the local scope filter restricts target devices that can be selected based on a location, and wherein the local scope filter comprises a global-like search for local devices; and establishing a device-to-device connection with a target device, wherein the establishing of the device-to-device connection is facilitated by the device-to-device connection settings data.

22. A method, comprising:

receiving a device-to-device connection settings data request from a mobile device;

determining appropriate device-to-device connection settings data based on the request; and transmitting the appropriate device-to-device connection settings, wherein the determining of appropriate device-to-device connection settings data comprises searching for target devices using a local scope filter corresponding to mobile device location data of the mobile device, wherein the local scope filter restricts target devices that can be selected based on a location, and wherein the local scope filter comprises a global-like search for local devices, and wherein the device-to-device connection settings data is configured to enable a mobile terminal to establish a device-to-device connection with a target device.

23. The method of claim 22, wherein the receiving of the device-to-device connection settings data request comprises receiving the mobile device location data configured to indicate a location of the mobile device.

24. The method of claim 23, wherein the determining of appropriate device-to-device connection settings data comprises generating a list of registered target devices based on the mobile device location data.

25. The method of claim 22, wherein the determining of the appropriate device-to-device connection settings data based on the request comprises determining appropriate device-to-device connection settings data based on a uniform resource locator in the request.

26. The method of claim 22, wherein the determining of the appropriate device-to-device connection settings data based on the request comprises selecting an appropriate webpage based on the request, wherein the appropriate webpage comprises an object with the appropriate device-to-device connection settings.

27. An apparatus, comprising:

a reception unit configured to receive a request for device-to-device connection settings data from a mobile device;

a determination unit configured to determine appropriate device-to-device connection settings data; and a target device search unit configured to search for target devices using a local scope filter corresponding to mobile device location data of the mobile device, wherein the local scope filter restricts target devices that can be selected based on a location, and wherein the local scope filter comprises a global-like search for local devices;

a transmission unit configured to transmit the appropriate device-to-device connection settings data, wherein the device-to-device connection settings data is configured to enable a mobile terminal to establish a device-to-device connection with a target device.

28. The apparatus of claim 27, wherein the reception unit is further configured to receive the mobile device location data configured to indicate a location of the mobile device.

29. The apparatus of claim 28, further comprising:

a target device search unit configured to generate a list of registered target devices based on the mobile device location data, wherein the transmission unit is configured to transmit target device list data to the mobile device.

30. The apparatus of claim 27, wherein the determination unit is configured to determine appropriate device-to-device connection settings based on a uniform resource locator in the request.

31. The apparatus of claim 27, wherein the determination unit is configured to determine appropriate device-to-device connection settings by selecting an appropriate webpage based on the request, wherein the appropriate webpage comprises an object with the appropriate device-to-device connection settings.

32. An apparatus, comprising:

means for receiving a request for device-to-device connection settings data from a mobile device;

means for determining appropriate device-to-device connection settings data based on the request; and means for transmitting the appropriate device-to-device connection settings, wherein the determining of appropriate device-to-device connection settings data comprises searching for target devices using a local scope filter corresponding to mobile device location data of the mobile device, wherein the local scope filter restricts target devices that can be selected based on a location, and wherein the local scope filter comprises a global-like search for local devices, and wherein the device-to-device connection settings data is configured to enable a mobile terminal to establish a device-to-device connection with a target device.

33. A computer program embodied on a non-transitory computer-readable medium, the computer program configured to control a processor to perform operations comprising:

receiving a request for device-to-device connection settings data from a mobile device;

determining appropriate device-to-device connection settings data based on the request; and transmitting the appropriate device-to-device connection settings, wherein the determining of appropriate device-to-device connection settings data comprises searching for target devices using a local scope filter corresponding to mobile device location data of the mobile device, wherein the local scope filter restricts target devices that can be selected based on a location, and wherein the local scope filter comprises a global-like search for local devices, and wherein the device-to-device connection settings data is configured to enable a mobile terminal to establish a device-to-device connection with a target device.

34. A method, comprising:

receiving a first device-to-device connection settings request from a mobile device;

translating at least a portion of the first device-to-device connection settings request into second request data;

transmitting a second device-to-device connection settings data request to a connection settings server, the second device-to-device connection settings request comprising the second request data generated by the translating;

receiving device-to-device connection settings data from the connection settings server, wherein the device-to-device connection settings data is determined based on selected target devices using a local scope filter, wherein the local scope filter restricts target devices that can be selected based on a location, and wherein the local scope filter comprises a global-like search for local devices; and transmitting the device-to-device connection settings data to the mobile device.

35. The method of claim 34, wherein the first device-to-device connection settings request comprises at least one of a phone number or a session initiation protocol address.

36. The method of claim 34, wherein the second request data comprises at least one of a uniform resource locator or a uniform resource identity.

37. The method of claim 34, wherein the method is performed by an application server.

38. An apparatus, comprising:

a reception unit configured to receive a first device-to-device connection settings request from a mobile device;

a translation unit configured to translate at least a portion of the first device-to-device connection settings request into second request data;

a transmission unit configured to transmit a second device-to-device connection settings data request to a connection settings server, the second device-to-device connection settings request comprising the second request data generated by the translation unit;

the reception unit further configured to receive device-to-device connection settings data from the connection settings server, wherein the device-to-device connection settings data is determined based on selected target devices using a local scope filter, wherein the local scope filter restricts target devices that can be selected based on a location, and wherein the local scope filter comprises a global-like search for local devices; and the transmission unit further configured to transmit the device-to-device connection settings data to the mobile device.

39. The apparatus of claim 38, wherein the first device-to-device connection settings request comprises at least one of a phone number or a session initiation protocol address.

40. The apparatus of claim 38, wherein the second request data comprises at least one of a uniform resource locator or a uniform resource identity.

41. The apparatus of claim 38, wherein the apparatus comprises an application server of a public wireless network.

42. An apparatus, comprising:

means for receiving a first device-to-device connection settings request from a mobile device;

means for translating at least a portion of the first device-to-device connection settings request into second request data;

means for transmitting a second device-to-device connection settings data request to a connection settings server, the second device-to-device connection settings request comprising the second request data generated by the translating; the uniform resource locator;

means for receiving device-to-device connection settings data from the connection settings server, wherein the device-to-device connection settings data is determined based on selected target devices using a local scope filter, wherein the local scope filter restricts target devices that can be selected based on a location, and wherein the local scope filter comprises a global-like search for local devices; and means for transmitting the device-to-device connection settings data to the mobile device.

43. A computer program embodied on a non-transitory computer-readable medium, the computer program configured to control a processor to perform operations comprising:

receiving a first device-to-device connection settings request from a mobile device;

translating at least a portion of the first device-to-device connection settings request into second request data;

transmitting a second device-to-device connection settings data request to a connection settings server, the second device-to-device connection settings request comprising the second request data generated by the translating; the uniform resource locator;

receiving device-to-device connection settings data from the connection settings server, wherein the device-to-device connection settings data is determined based on selected target devices using a local scope filter, wherein the local scope filter restricts target devices that can be selected based on a location, and wherein the local scope filter comprises a global-like search for local devices; and transmitting the device-to-device connection settings data to the mobile device.

44. A system, comprising:

a mobile device;

a target device; and a connection settings server, wherein the mobile device is configured to transmit a request for device-to-device connection settings data to the connection settings server, the connection settings server is configured to receive the request, determine appropriate device-to-device connection settings data, and transmit the appropriate device-to-device connection settings data to the mobile device, the mobile device is further configured to receive the appropriate device-to-device connection settings data, wherein the device-to-device connection settings data is determined based on selected target devices using a local scope filter, wherein the local scope filter restricts target devices that can be selected based on a location, and wherein the local scope filter comprises a global-like search for local devices, and establish a device-to-device connection with the target device, wherein the establishing of the device-to-device connection is facilitated by the device-to-device connection settings data.

* * * * *